United States Patent
Miller

[11] Patent Number: 6,152,643
[45] Date of Patent: Nov. 28, 2000

[54] COUPLING FOR INSERTING A SOAKING BAR INTO A BLAST FURNACE TAP HOLE

[75] Inventor: Martin P. Miller, Portersville, Pa.

[73] Assignee: Woodings Industrial Corporation, Mars, Pa.

[21] Appl. No.: 09/157,547

[22] Filed: Sep. 21, 1998

[51] Int. Cl.[7] ..................................... F16B 2/14
[52] U.S. Cl. .................. 403/307; 403/301; 403/307; 403/327; 403/328; 279/23.1; 279/46.7; 279/906
[58] Field of Search .................... 403/314, 310, 403/309, 307, 305, 301, 300, 328, 327; 279/906, 23.1, 46.7, 54, 24, 28, 29

[56] References Cited

U.S. PATENT DOCUMENTS

| | | | |
|---|---|---|---|
| 859,976 | 7/1907 | Procunier | 279/46.7 X |
| 2,397,025 | 3/1946 | MacBlane | 279/46.7 X |
| 2,591,287 | 4/1952 | Pellar et al. | 279/58 X |
| 2,652,273 | 9/1953 | Davis | 403/300 |
| 2,657,933 | 11/1953 | Stuebner | 297/54 |
| 3,078,112 | 2/1963 | Mathey | 403/305 |
| 3,446,509 | 5/1969 | Colosimo | 279/57 |
| 4,111,587 | 9/1978 | Hatanaka | 279/1 SG X |
| 4,463,960 | 8/1984 | Walton | 279/60 X |
| 5,067,844 | 11/1991 | Bowmer et al. | 403/305 |
| 5,081,811 | 1/1992 | Sasaki | 52/227 |

FOREIGN PATENT DOCUMENTS

| | | | |
|---|---|---|---|
| 2855284 | 7/1979 | Germany | 279/905 |
| 2096499 | 10/1982 | United Kingdom | 279/23.1 |

*Primary Examiner*—Lynne H. Browne
*Assistant Examiner*—Ernesto Garcia
*Attorney, Agent, or Firm*—James Ray & Associates

[57] ABSTRACT

A coupling device for use in inserting a soaking bar into a clay plugged blast furnace tap hole with a rotary percussion tool, having a first axial aperture at a first end adapted to be fitted onto a driving post of a rotary percussion tool, and having a second axial aperture at a second end adapted to receive and retain an end of a soaking bar in axial alignment with the coupling. The second axial aperture further includes jaws for releasably engaging the end of the soaking bar, and an impact body for transferring axial impact loads from the rotary impact tool to the end of the soaking bar.

9 Claims, 4 Drawing Sheets

COUPLING FOR INSERTING A SOAKING BAR INTO A BLAST FURNACE TAP HOLE

FIELD OF THE INVENTION

This invention relates generally to the art of opening a blast furnace tap hole by removing a preinserted soaking bar therefrom. More particularly this invention relates to a unique new coupling device for use in inserting such a soaking bar into a clay-plugged tap hole prior to starting a new blast furnace heat, which coupling permits a quick and easy connection to the soaking bar, and a self-release of the soaking bar from the coupling after the soaking bar has been inserted.

BACKGROUND OF THE INVENTION

It is well known in the steel making art that the hearth of an iron blast furnace is provided with a tap hole, commonly referred to as an "iron notch" through which molten iron, usually referred to as "hot metal", is drawn off at periodic intervals during a blast furnace campaign. During a normal campaign, such tapping must be done on an average of five to twelve times daily as the blast furnace hearth becomes filled with molten iron and slag. After the blast furnace has been tapped; i.e., the molten hot metal and slag drained therefrom, the tap hole or iron notch is plugged with clay or "mud" which will harden in place to seal the tap hole until the next time the blast furnace is tapped.

In accordance with more conventional prior art practices, a special drill is utilized to open the tap hole; i. e., drill a passage way through the hardened clay plugging the iron notch for purposes of tapping the blast furnace through such the drilled hole. Such blast furnace tap hole drills are normally pneumatically or hydraulically operated rotary percussion drills comparable to the rock drills utilized in the mining industry. Such drills normally impart both a rotary and an impact force on an elongated drill rod having a rock drill bit at the end towards the iron notch.

More recently, some steel mills have converted to a "soaking bar practice" for tapping a blast furnace wherein, like the prior practice, a pliable, moist clay is used to plug the iron notch, but before the clay hardens completely, an elongated steel rod, referred to as a "soaking bar" is inserted through the pliable, moist clay plug so that the clay plug will harden around the steel soaking bar. The end of the soaking bar within the blast furnace hearth will naturally conduct a considerable amount of heat to the interior body of the clay plug, which not only hastened hardening of the clay plug, but tends to better cure the clay plug as an annular body around the soaking bar, so that when the blast furnace is ready to be tapped, the soaking bar can be pulled from the iron notch leaving a cleaner, more uniform, cylindrical aperture through the clay plug through which hot metal and slag can be tapped. The cleaner and better cured aperture will not only contribute to the ease and success of the hot metal flow therethrough during the tap, but the procedure eliminates many of the problems and costs previously encountered in the drilling of a tap hole.

The soaking bar is typically a cylindrical steel bar having a diameter of 1 to 2 inches, a length of from 10 to 15 feet, an end which is sharpened generally to a point (so that it can be driven into and through the clay plug), with the opposite end being threaded for purposes of attaching it to a coupling on the end of a two-directional pneumatic or hydraulic driving hammer so that it can be pulled from the clay plug. Like the prior art blast furnace tap hole drills, such driving hammers are usually pneumatically or hydraulically operated rotary percussion tools which impart both a rotary and an impact force on the outer end if the soaking bar to drive it into and through the unhardened clay. When a tap of the blast furnace is necessary, the same driving hammer is normally utilized by attaching it to the outer end of the soaking bar, and by utilizing the same rotary-impact force in the reverse direction, the soaking bar is withdrawn from the clay plug, which, as noted above, normally leaves a uniform, cylindrical aperture through the clay plug through which the blast furnace hot metal and slag are tapped. After tapping is completed, the iron notch is again plugged with pliable, moist clay and the procedure repeated for another heat of hot metal.

Since the prior art use of tap hole drills normally utilizes a rather large pneumatic or hydraulic drill which is interlinked to a base support such that the drill can be easily moved into and from a position for drilling the tap hole, this latter practice of utilizing a soaking bar has normally relied on the tap hole drill that is already present for the purposes of both inserting and removing the soaking bar into and from the clay plug plugging the blast furnace tap hole, as indeed the prior art drills are capable of imparting two-directional rotary, impact forces, not only as necessary to drill a tap hole, but also as necessary to insert and remove the soaking bars. Therefore, while the specific tapping practice may be changing, the equipment to be utilized in the soaking bar practice is not really different from the equipment utilized in the older tap hole drilling practice.

One thing that has not changed significantly, is the fact that which ever practice is utilized the effort to achieve a blast furnace tap is not a pleasant one. That is to say, the manual task of inserting and removing a soaking bar is still as unpleasant as the task of drilling a tap hole. Specifically, the tap crew must still work in a hot and hazardous environment adjacent to a hot blast furnace with interior temperatures well in excess of 3,000 F. Also, the atmosphere adjacent to a blast furnace is far from pleasant, as it usually contains noxious gases that manage to escape from the furnace. In addition, the site is always adjacent to the runner through which the blast furnace has previously been tapped. This runner, consisting of a fire-brick lined trough, usually built into the floor adjacent to the blast furnace, will usually retain an excessive amount of heat for a rather long period of time after the hot metal and slag have been tapped. Naturally any metallic component within the near vicinity of the tap hole, such as the drill, hammer, soaking bar plugging the tap hole, and the like, will be to hot to handle without protective gloves and additional protective clothing. Therefore, the tap crew is always anxious to prepare for a tap as quickly as possible in an effort to spend as little time as necessary in the rather unpleasant atmosphere in which they must work.

One practice that has become rather common in this effort to expedite the tap procedure, at least when using the soaking bar practice, is to use an old rag, or the like, wrapped around the soaking bar end to bind the outer end of the soaking bar into the coupling at the end of the rotary percussion tool. While this may reduce the amount of time necessary to connect the soaking bar to the coupling, it can and does often lead to later problems, such as the possibility that the soaking bar may not be well connected to the coupling, with the result that it may fall from the coupling during the effort the insert it into and through the clay plug. Should this result, the tapping time will of course be prolonged, as the hot soaking bar must be retrieved, reinserted into the coupling, and an attempt again made to insert it into and through the clay plug.

SUMMARY OF THE INVENTION

The present invention is predicated upon the conception and development of a new and unique coupling device for use in inserting a soaking bar into a clay plugged blast furnace tap hole, a coupling which can quickly and easily be replaceably attached to a driving post of a rotary percussion tool, a coupling to which a soaking bar can quickly, easily and more positively be attached with little or no likelihood that it will become unattached while attempting to drive it through the clay plug, and at the same time will readily disengage itself from the soaking bar after the soaking bar is fully inserted into and through the clay plug, so that the rotary percussion tool can quickly and easily be withdrawn from the vicinity after the soaking bar is inserted.

In essence and in it simplest form, the coupling or coupling device of this invention comprises a body member which, ideally, is cylindrical in form, and has an aperture at each end, substantially like any other coupling. A first aperture at a first end is provided with a threaded internal surface for purposes of threading, (i.e., attaching) the coupling to a driving post of a rotary percussion tool or whatever tool is to be utilized to drive the soaking bar into the clay plug. A second aperture at a second end of the coupling device is provided for receiving the end of a soaking bar, and is quite different from conventional couplings, in that it includes a plurality of jaws therein for releasably engaging the end of the soaking bar, and an impact body for transferring axial impact loads from the rotary impact tool through the coupling to the end of the soaking bar. The plurality of jaws and impact body cooperate to maintain the soaking bar in a jaw engaged condition as long as the soaking bar is fully inserted into the coupling, and/or biased inwardly during the soaking bar insertion activity, but when the soaking bar has been penetrated to the desired depth, the longitudinal feed force is reversed, which enables jaws to release the soaking bar. Accordingly, as long as the soaking bar resists the forces tending to drive it into and through the clay plug, the plurality of jaws will maintain their grip on the end of the soaking bar. Thereafter, when the soaking bar is fully inserted and the impact forces reversed, the jaws, working against a compression spring, will expand and thereby release their grip on the soaking bar. Accordingly, by reversing the feed forces, the coupling device can be virtually removed from the end of the soaking bar, with the result that the rotary percussion tool can readily be moved to an out-of-the-way position without the need for anyone having to uncouple the soaking bar from the coupling device.

OBJECTS OF THE INVENTION

It is, therefore, a primary object of the present invention to provide a new and unique coupling or coupling device for coupling a soaking bar to rotary percussion tool in the practice of inserting such a soaking bar into a clay plugged blast furnace tap hole which will greatly simplify the procedure.

It is another primary object of the present invention to provide such a new and unique coupling device that can easily and quickly be replaceably connected to, or disconnected from, a driving post of a rotary impact tool.

It is a further primary object of the present invention to provide such a new and unique coupling device to which a soaking bar can easily, quickly and positively be attached.

It is a still further primary object of the present invention to provide such a new and unique coupling device which maintains such a positive attachment to a soaking bar while the soaking bar is being inserted, but will be self-releasing after the soaking bar is fully inserted and the longitudinal feed forces reversed.

It is an even further primary object of the present invention to provide such a new and unique coupling device having all of the above capabilities, and which is sufficiently robust to be adapted for repeated use in an environment adjacent to a blast furnace tap hole.

These and other objects and advantages of this invention will be realized from a full understanding of the following detailed description particularly when read in conjunction with the attached drawings, as described below.

DESCRIPTION OF A PREFERRED EMBODIMENT OF THE INVENTION

Figure 1:
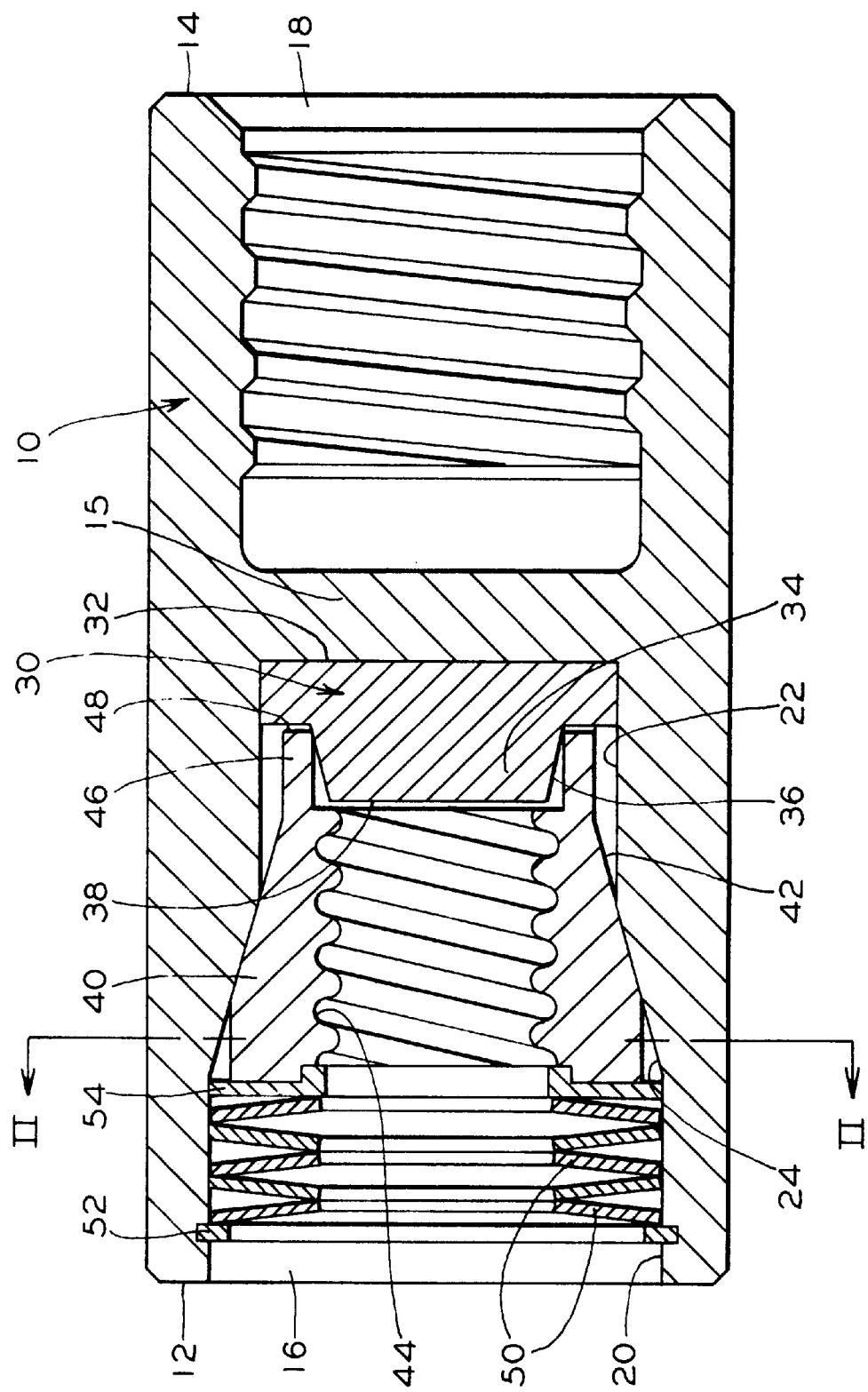
FIG. 1 is a cross-sectional side view of a presently preferred embodiment of the coupling device of this invention, with the section taken through the longitudinal axis thereof.

Prior to proceeding with a more detailed description of the coupling device of this invention, it should be noted that throughout all views illustrated in the attached drawings, identical components which have associated therewith identical functions have been identified with identical reference numerals for the sake of clarity.

Figure 2:
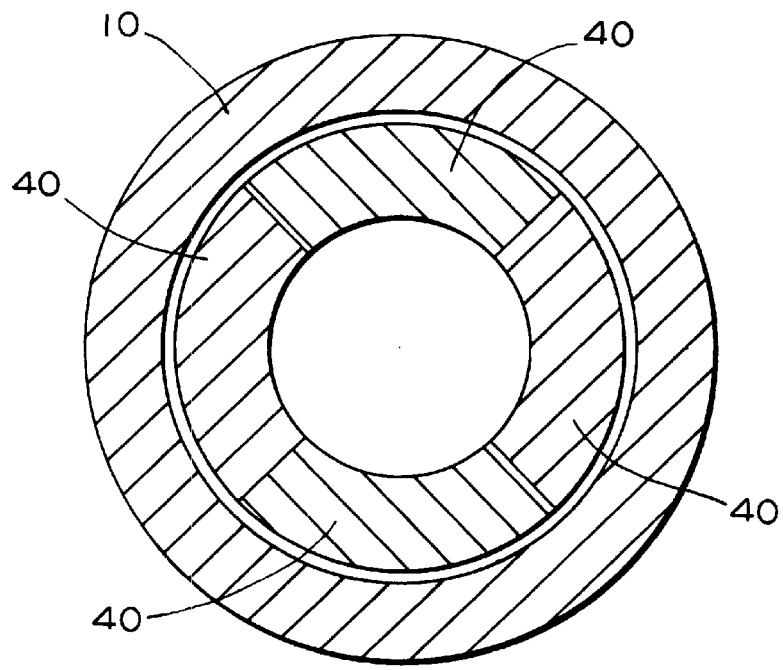
FIG. 2 is a cross-sectional, axial end view of the coupling device shown in FIG. 1, with the section taken at line II—II on FIG. 1.

Referring now to the drawings, FIGS. 1 and 2 illustrate a presently preferred embodiment of the coupling device of this invention which comprises a solid body 10, such as a steel body which is preferably, generally cylindrical in form, having a first axial aperture 16 at a first end 12 of body 10, and a second axial aperture 18 at a second end 14 of said body 10. Apertures 16 and 18 are of course, axially opposite each other extending into body 10, but rather than communicating with each other, apertures 16 and 18 are spaced apart by web portion 15 of solid body 10 transversely disposed between apertures 16 and 18.

Aperture 18 is intended to be attached to a driving post (not shown) of a rotary percussion tool (not shown) and should, therefore, have a threaded internal surface for purposes of effecting such attachment by threading coupling 10 onto such a driving post (not shown). While any conventional threading can be utilized if desired, it is preferred that an exceptional heavy, quick release, threading be provided so that the rotary impact forces to be transmitted through body 10 are not likely to damage the threads. For example, the mine drilling art is well familiar of a number of different heavy thread designs that can be utilized, such as rope threads, trapezoidal threads, double entry threads, Hi-Lead threads and others, any of which are ideal for this application. Since such heavy thread designs are well known in the art of mine drilling for the purpose of providing a more robust coupling, as well as providing a quick release coupling, they need not be further discussed here, suffice it to say that whatever advantages such heavy thread designs provide to the mine drilling art, those same advantages would be beneficial to this art of inserting soaking bar into clay plugged blast furnace tap holes. An example of an ideal heavy threading as noted above, is disclosed in U.S. Pat. No. 4,687,368, assigned to the assignee of this invention, and is incorporated herein by reference.

Aperture 16, on the other hand, is intended to receive and retain an end of a soaking bar 60, specifically the soaking bar to be driven into and through the clay plugged blast furnace tap hole (not shown), and accordingly includes a means therein for releasably engaging such an end of a soaking bar 60, and further includes a means for transferring axial impact loads from the rotary impact tool (not shown) to the end of soaking bar 60. Therefore, rather than being completely cylindrical in form, aperture 18 has a cylindrical outer end portion 20 and a slightly smaller cylindrical base portion 22 with a mid-portion 24 between the two cylindrical portions 20 and 22, having a conically tapered side wall, as shown. The base of the inner cylindrical portion 22 is a relatively flat, circular face formed by the side of web portion 15, and is circular in form, and adapted to loosely receive and abut the larger, cylindrical side face 32 of impact body 30. Impact body 30 is formed of a relatively hard steel having an ability to withstand impact forces without significant deformation, and having a cylindrical, "wafer-like" side 32 disposed against the base of cylindrical portion 20 of first axial aperture 16 (i.e., against a side of web portion 15 of body 10). In addition, impact body 30 has an axial protrusion 34 opposite the cylindrical side 32 with a uniform, conical side wall 36. Axial protrusion 34 is provided with a flat outer surface 38 adapted to abut against the end of a soaking bar 60 inserted into the aperture 16.

Next to be inserted into aperture 16, is a plurality of jaw members 40 which jaw members are arranged in a side-by-side relationship, which in combination form a sleeve-like collar with a generally cylindrical opening at the axis of the sleeve-like collar which will be disposed around the end of any soaking bar 60 inserted into aperture 16. Accordingly, each jaw member 40 forms a segment of the sleeve-like collar and jointly form a tapered-cylindrical outer surface 42 of the sleeve-like collar which is adapted to engage against the conically tapered side wall of mid-portion 24 of aperture 16. Accordingly, the two tapered surfaces; i.e., the side wall of mid-portion 24 and the combined outer surfaces 42 of the plural jaws 40, making-up the sleeve-like collar, are configured such that a force pushing jaw members 40 into aperture 16 will force jaws 40 radially inward towards each other, so that the generally cylindrical opening axially disposed between the plural jaw members 40, and defined by curved surfaces 44, becomes smaller in diameter, and thus able to properly mate with the threaded end of a soaking bar 60. While combined curved surfaces 44 are shown to have a combined threaded surface, the combined surfaces 44 can vary significantly depend upon the outer surface nature of the end of the soaking bar 60 which is to be held by the combined surfaces 44. If soaking bar 60 has a shallow threaded end, the combined surfaces 44 may provide a matching threaded surface as shown, or at least a cylindrical surface, threaded or unthreaded, that will engage the outer periphery of the soaking bar 60.

A coil spring member, such as a stack of Belleville washers 50, are disposed within cylindrical outer end portion 20 of aperture 16, for the purpose of biasing jaw members 40 inwardly into aperture 16. As can be seen, Belleville washers 50 are stacked one upon the other and retained between a keeper ring 52 and a washer 54 at the base of the plurality of jaw members 40. Accordingly, the coil spring or Belleville washers 50 will serve to bias jaws 40 inwardly and against tapered side wall of mid-portion 24 of aperture 16, thereby minimizing the diameter of the axial opening between jaw members 40 formed by surfaces 44.

As can further be seen, the inward ends of jaw members 40, each have a forwardly extending, arcuate, tab portion 46, which in combination with each other, jointly form an expandable cylindrical opening to the sleeve-like collar formed by jaw members 40, the inner, corner edges of which are in contact with the conical side wall 36 of impact body 30, with the flat end surfaces 48 not quite reaching the flat inner surface of cylindrical, wafer-like side 32 of impact body 30. As should be apparent from an examination of FIG. 1, any outward movement of jaw members 40, relative to the tapered side wall of mid-portion 24 of aperture 16, will allow the jaws 40 to expand radially outward thereby releasing any engagement they may have on the end of soaking bar 60.

In operation and use of coupling device 10, it is obvious that the coupling 10 should be mounted onto a driving post (not shown) of a rotary percussion tool (not shown) as by turning coupling device 10 onto a threaded post of a rotary percussion tool as described above. When it becomes necessary to insert a soaking bar into a clay plugged tap hole, the non-pointed end of a soaking bar 60 is inserted into second aperture 16 of coupling device 10 as far as it will go. Accordingly, the flat end of the soaking bar 60 should be inserted until it comes into contact with the flat outer surface 38 of axial protrusion 34 on impact body 30. This requires the twisting of soaking bar 60 into thread-like surfaces formed by the plurality of combined surfaces 44. When so fully inserted, jaw members 40 will also be pushed axially inward as far as they will go so that the tapered side surface of mid-portion 24 of aperture 18 will also force jaw members 40 radially inward so that the curved surfaces 44 will engage the sides of soaking bar 60, and retain it in a position biased against impact body 30. Then, when the rotary impact tool (not shown) is activated to drive soaking bar 60 into the clay plugged tap hole, any resistance encountered will serve to bias the soaking bar 60 inwardly, and thus maintain it against impact body 30, and further maintain curved surfaces 44 of jaw members 40 in engagement with soaking bar 60. When soaking bar 60 is fully inserted into the clay plugged tap hole to the extent desired, the longitudinal feed forces should be reversed. The reversal of the longitudinal feed forces will not only reverse the biasing force of soaking bar 60 against impact body 30, but will cause impact body 30, acting through jaw members 40, to compress the Belleville spring 50, while simultaneously permitting jaw members 40 to expand radially outward, inasmuch as they will no longer be restricted by the taper side surface 24 of aperture 16. Accordingly, jaw members 40 will spread apart releasing their grip on soaking bar 60. Continued application of the reverse longitudinal feed forces will virtually remove the coupling device entirely from the soaking bar 60, permitting the coupling and the rotary impact tool to be move away from the inserted soaking bar 60 and the vicinity.

Figure 3:
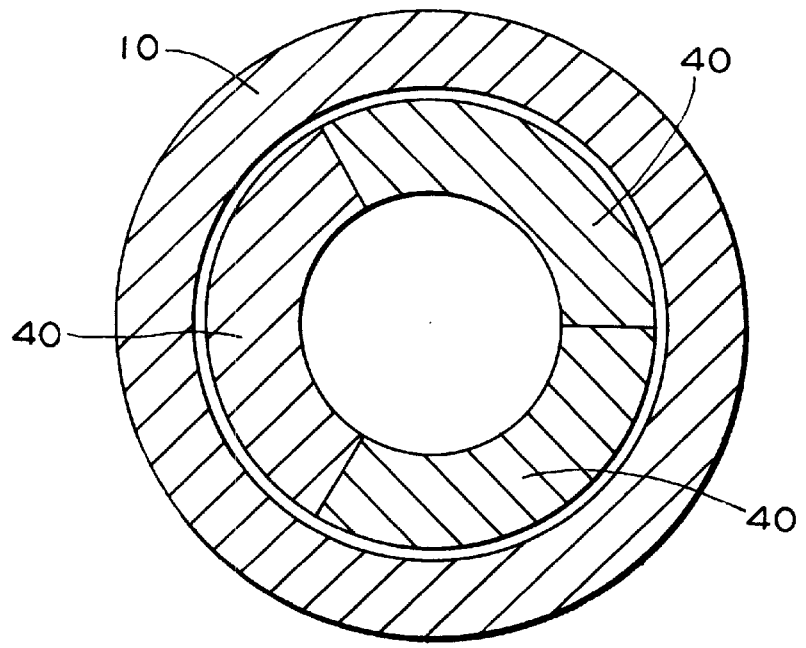
FIG. 3 is a cross-sectional, axial end view substantially the same as FIG. 2 but illustrating a modified embodiment utilizing three jaw members rather than four as illustrated in FIG. 2.
Figure 4:
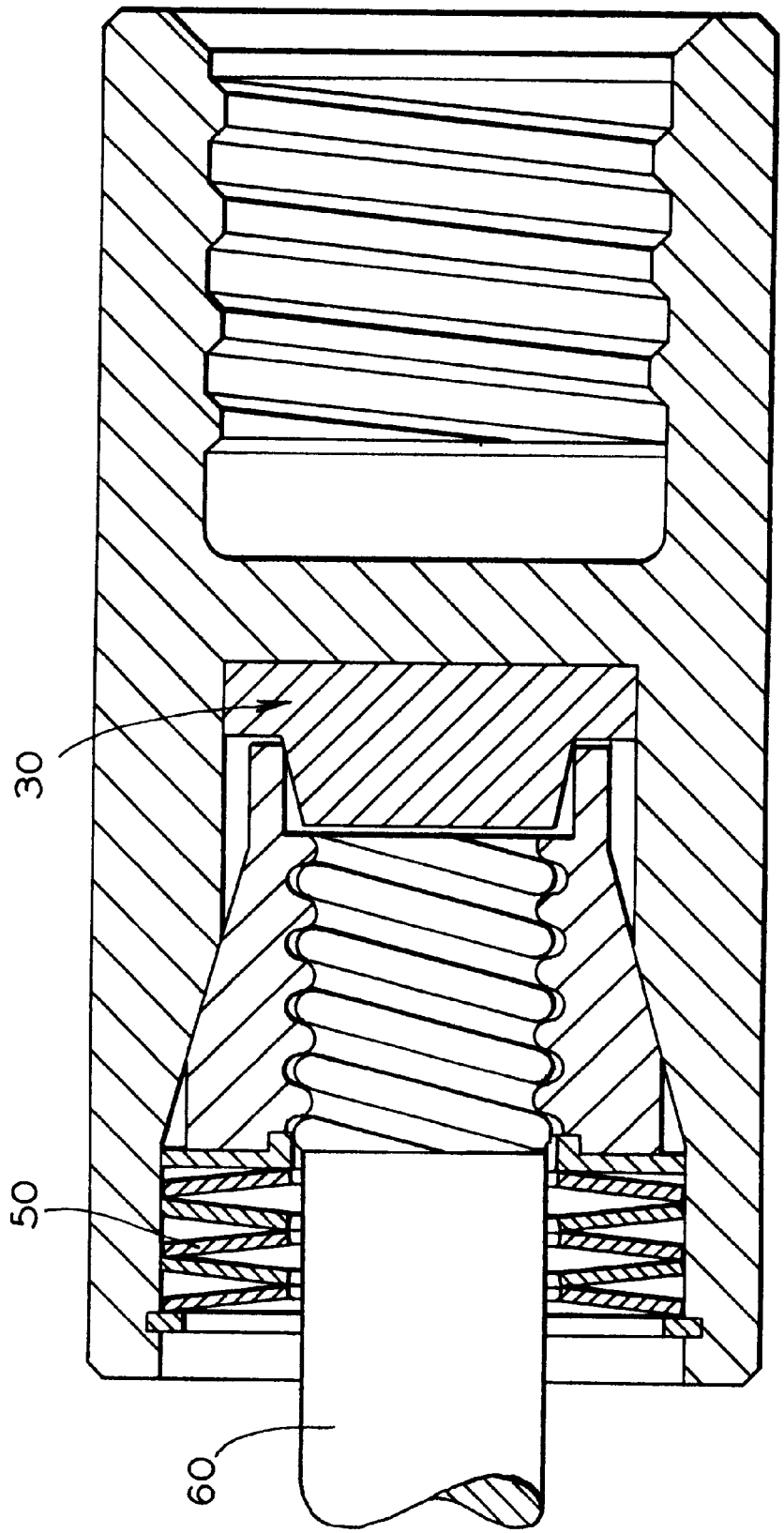
FIG. 4 is substantially the same as FIG. 1 but showing a soaking bar fully inserted into the second aperture as necessary to grip and retain the soaking bar within the coupling for purposes driving the soaking bar into a clay plugged blast furnace tap hole.
Figure 5:
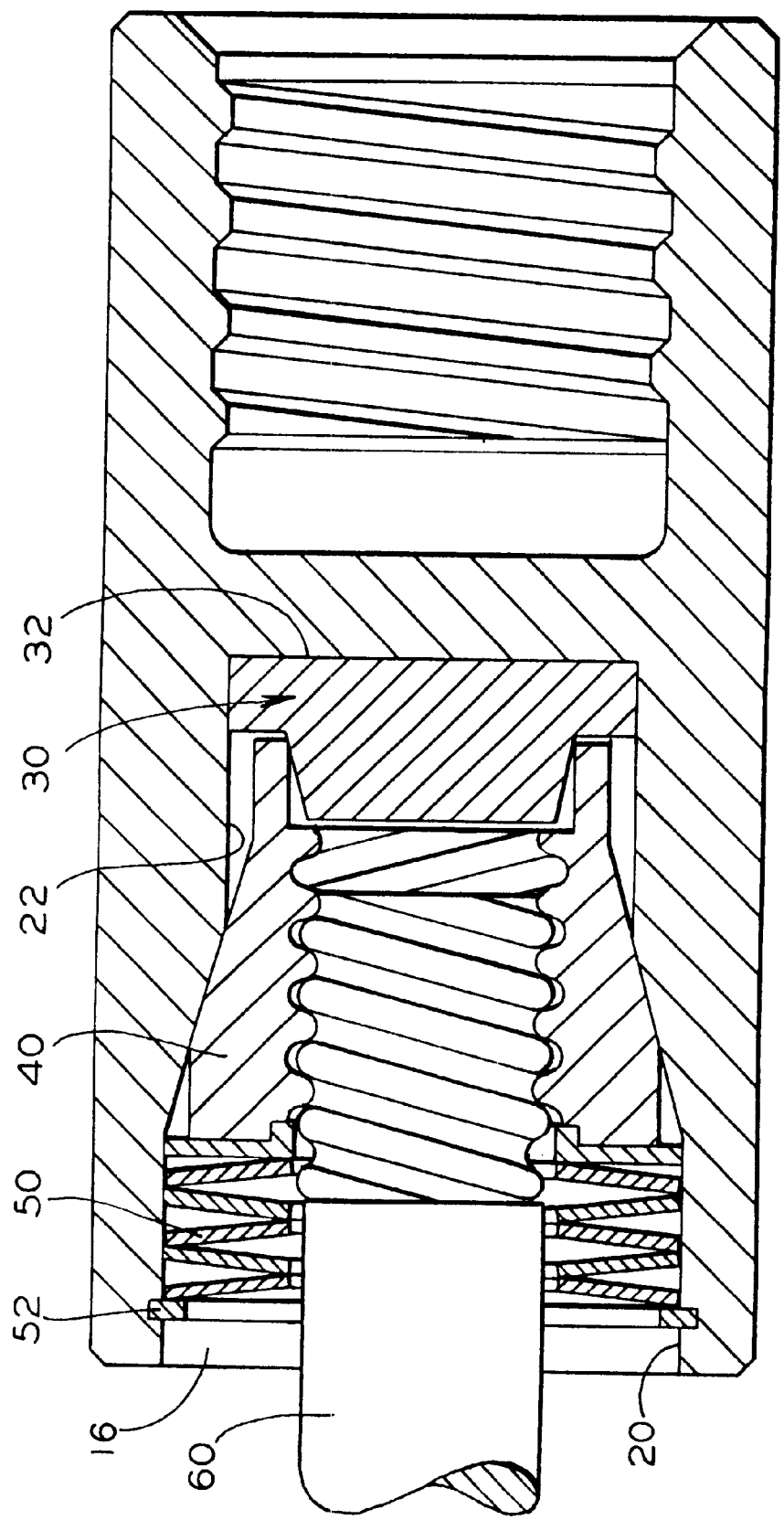
FIG. 5 is substantially the same as FIG. 4 but showing the soaking bar in a self-released condition from the coupling after it has been fully inserted into and through the clay plugged blast furnace tap hole and the longitudinal feed forces reversed.

In the embodiment of the invention shown in FIG. 2, four jaw members 40' are provided, each of which comprises a quadrant of the sleeve-like collar formed by jaw members 40'. While more than four such jaws members 40 can be provided to form the sleeve-like collar, it is obvious that not less than three be utilized, as shown in FIG. 3, least it may not be possible to release the grip of curved surfaces 44 from the sides of soaking bar 60.

While two embodiment of the invention are depicted in the drawings and described above, it should be apparent the a great number of other embodiments could be devise and modifications made to those embodiments shown without departing from the spirit of the invention. For example, as already discussed three or more jaw members 40 can be provided each comprises a segment of the sleeve-like collar and designed to function as above described. As another example, means other than belleville washers 50 can be utilized to bias jaw members 40 into aperture 16, such as for example a more conventional compression, coil spring could be utilized. Obviously therefore, a large number of differing embodiments and modifications could be utilized without departing from the spirit of the invention or the scope of the appended claims.

What is claimed is:

1. A coupling device for use in inserting a soaking bar into a clay plugged blast furnace tap hole with a rotary percussion tool, said coupling device comprising a generally cylindrical body having;

(a) a first axial aperture at a first end for fitting said coupling device onto a driving post of said rotary percussion tool, (b) a second axial aperture at a second end for receiving an end of said soaking bar in axial alignment with said coupling, said second axial aperture further including;
        1. an impact body defining a base surface thereof for transferring axial impact loads from such rotary impact tool to such soaking bar, and
        2. means to receive and retain such soaking bar in axial alignment with said coupling and against said impact body which comprises a plurality of spring biased jaw members disposed in a circular arrangement against said impact body and equally spaced around such end of said soaking bar, and which in cooperation with internal side walls of said second axial aperture, said jaw members are forced inwardly against such end of said soaking bar releasably engaging such end of such soaking bar when such soaking bar is fully inserted into said second axial aperture.

2. A coupling device according to claim 1, in which a plurality of spring biased jaw members forming said circular space therebetween are provided with a thread machined texture for insertion of soaking bar.

3. A coupling device according to claim 1, in which the surfaces of said plurality of spring biased jaw members forming a circular space therebetween jointly form a helical grove adapted to engage a matching threaded end of such soaking bar.

4. A coupling device according to claim 1, in which said plurality of spring biased jaw members comprise at least three spring biased jaw members disposed equally spaced around such end of such soaking bar.

5. A coupling device according to claim 1, in which spring biased jaw members have tapered side walls adapted to slidably engage an annular tapered side wall of said second axial aperture such that fully inserting such soaking bar will cause the plurality of jaw members to be forced radially inward against such end of such end of such soaking bar.

6. A coupling device according to claim 5, in which said impact body is provided with wedge means thereon adapted to wedge apart said spring biased jaw members when reverse longitudinal forces are applied.

7. A coupling device according to claim 6, in which said wedge means comprises an outwardly extending protrusion having a conical sidewall adapted to wedge between said spring biased jaw members.

8. A coupling device according to claim 7, in which said spring biased jaw members are biased inwardly into said second axial aperture by a cylindrical compression spring biasing said jaw members inwardly into said second axial aperture.

9. A coupling device according to claim 8, in which said cylindrical spring comprises a plurality of adjacent belleville washers biased against the outer ends of said jaw members.

* * * * *